United States Patent [19]
Close

[11] 4,209,186
[45] Jun. 24, 1980

[54] LOCK-UP INHIBITOR FOR DOOR MOUNTED RETRACTOR

[75] Inventor: Albert R. Close, Redondo Beach, Calif.

[73] Assignee: American Safety Equipment Corporation, San Fernando, Calif.

[21] Appl. No.: 951,715

[22] Filed: Oct. 16, 1978

[51] Int. Cl.² ............................................. A62B 35/02
[52] U.S. Cl. .................................. 280/803; 242/107.4; 280/806
[58] Field of Search .............. 280/744, 745, 747, 806; 242/107.4 A

[56] References Cited
U.S. PATENT DOCUMENTS

| | | | |
|---|---|---|---|
| 3,838,831 | 10/1974 | Bell | 242/107.4 A |
| 3,889,878 | 6/1975 | Ziv | 242/107.4 A |
| 4,007,802 | 2/1977 | Rosa | 242/107.4 A X |
| 4,018,400 | 4/1977 | Henderson | 242/107.4 A |
| 4,059,242 | 11/1977 | Tanaka | 242/107.4 A |

Primary Examiner—John J. Love
Assistant Examiner—Norman L. Stack
Attorney, Agent, or Firm—Poms, Smith, Lande & Rose

[57] ABSTRACT

A fail-safe lock-up inhibitor for a vehicle door-mounted passive safety belt retractor. The improved inhibitor is formed of a plurality of mutually overriding inhibiting structure such that when the vehicle door is open, each alone is capable of allowing lock-up of the safety-belt protraction mechanism during an emergency condition.

11 Claims, 4 Drawing Figures

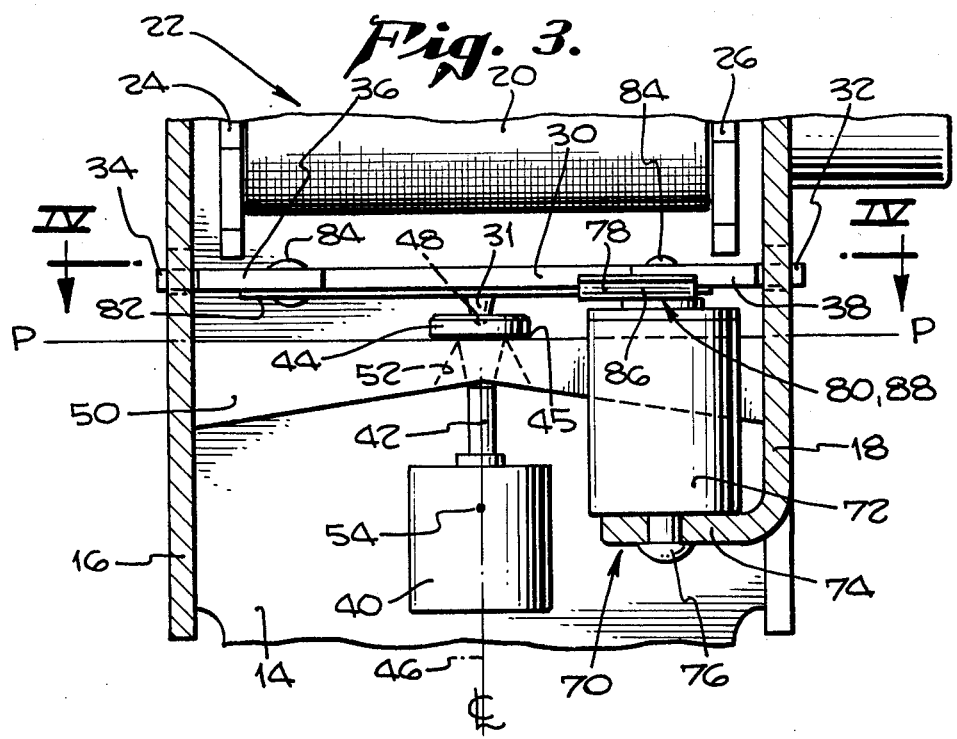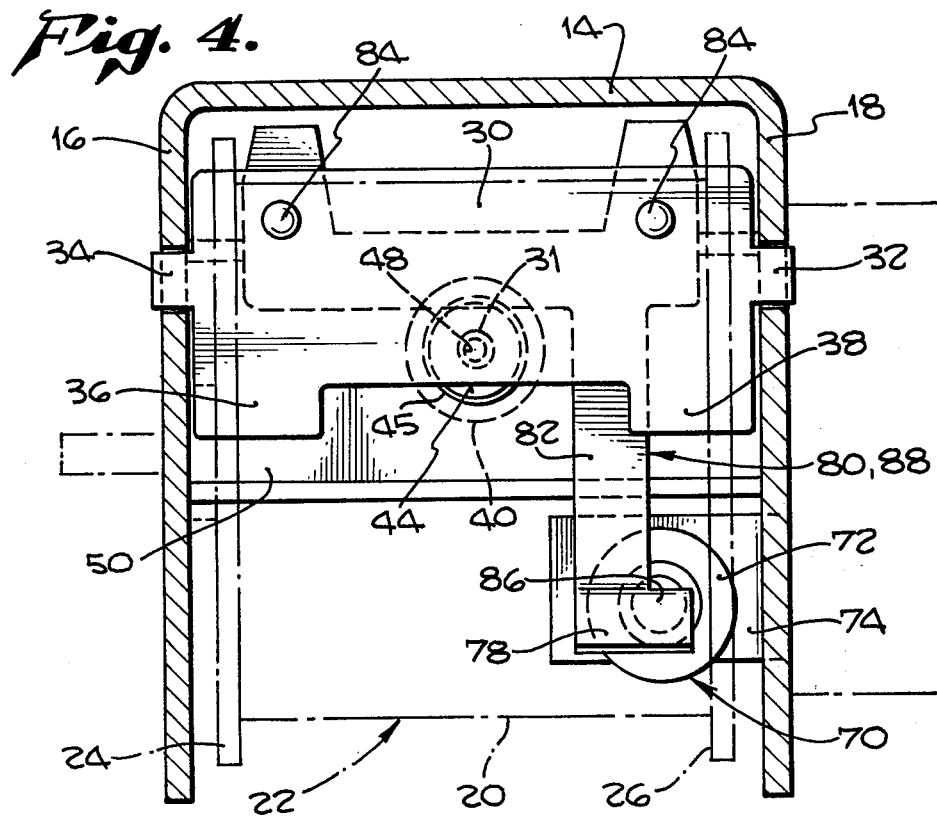

LOCK-UP INHIBITOR FOR DOOR MOUNTED RETRACTOR

BACKGROUND OF THE INVENTION

The present invention relates generally to passive vehicle safety belt systems and, more particularly, to systems for inhibiting lock-up of an inertially operated passive safety belt system take-up spool when, during non-emergency conditions, the vehicle door is open.

In the copending application of William M. Hollowell and Avraham Ziv entitled "VEHICLE SENSING INERTIA REEL LOCKUP INHIBITOR", Ser. No. 872,306, filed Jan. 25, 1978, and assigned to the common assignee of this application, an in-depth discussion is made of various vehicular safety belt systems and one technique for inhibiting, but not preventing, lock-up during the opening of the vehicle door of an inertially operated safety belt retractor of the type mounted within the door of the vehicle to provide upper torso restraint. According to the teaching of said application, an external biasing force is applied to the high inertia mass contained within the retractor activation mechanism during the door opening operation in order to make the high inertia mass more resistive to moving from the unlocked to the locked position during door opening operations. Several embodiments for accomplishing this are shown therein. A separate sensor (mechanical or electrical) is employed according to the teaching of said application to apply and remove the biasing force to the high inertia mass.

In the copending application of Albert R. Close entitled "AUTOMATIC RETRACTOR INHIBITOR," Ser. No. 878,730, filed Feb. 17, 1978, and assigned to the common assignee of this application, further improved variations are shown for providing a simpler, less costly, and/or faster operating retractor inhibiting mechanism. According to the teaching of said application, a second fulcrum point is selectively engaged whenever the door is open to impose a longer moment arm upon the pendular high inertia mass to increase the magnitude of force, in the direction associated with opening the door, necessary to cause the pawl to engage the spool causing lock-up. A second variation of inhibiting means disclosed by said application includes the selective engagement of a second fulcrum point with a tippable high inertia mass whenever the door is open, to inhibit tipping of said mass in the direction associated with opening of the door to, again, inhibit motion of the pawl into locking engagement with the spool during non-emergency conditions.

While the various apparatus disclosed in said copending applications work well for their intended purposes in many applications, there are some instances where lock-up in a fail-safe manner is highly desirable.

SUMMARY OF THE INVENTION

It is therefore a primary object of the present invention to disclose and provide a fail-safe lock-up inhibitor for passive, inertially operated safety belt retractors to insure lock-up, even though in an inhibiting condition, whenever lateral forces exceeding a predetermined level associated with an emergency condition are encountered.

It is a further object of the present invention to disclose and provide a plurality of mutually overriding safety belt retractor inhibitors such that lock-up will occur during an emergency condition regardless of the failure of any one of the inhibiting mechanisms to operate properly.

Generally stated, the present invention is an improved lock-up inhibitor for use with a passive, inertially operated safety belt retractor system which provides a plurality of mutually overriding safety belt retractor inhibitors such that high lateral forces associated with an emergency condition will alternatively override any one of the lock-up inhibitors to cause retractor lock-up, thus preventing protraction of the safety belt.

More simply stated, a first inhibiting means is provided to impose a magnetic force resisting motion of a pawl into locking engagement with a spool associated locking means. The first inhibiting means is activated by a vehicle door sensing means such that the inhibiting means is in an inhibiting condition whenever the vehicle door is open. An interconnecting means is provided that is operable between said pawl and said first inhibiting means and includes a second inhibiting means. Said second inhibiting means, activated by said first inhibiting means, imposes a force that further resists motion of said pawl into locking engagement with said spool associated locking means to inhibit, but not prevent, lock-up of the safety belt retractor. Whenever the vehicle door is open, said inhibiting means operate to inhibit the undesired lock-up of the safety belt retractor associated with the forces encountered during the normal opening of the vehicle door. This invention adds a fail-safe feature in that when excessive forces associated with an emergency condition are encountered, each of the inhibiting means is alternatively capable of causing lock-up by overriding the other inhibiting means, thus providing passenger restraint during an emergency condition. This mutually overriding feature of the present invention allows lock-up to occur despite the mechanical failure of any one of the inhibiting means.

More specifically, in an inertially operated safety belt retractor having a spool associated locking means engaged by a moveable pawl that moves into engagement with the spool associated locking means in response to lateral forces upon a high inertia mass, a first inhibiting means is provided that includes an electromagnet. Said electromagnet is operably connected to a vehicle door sensing means such that said sensing means activates said electromagnet into an energized condition whenever the vehicle door is open. An interconnecting means is provided that is operable between said pawl and said first inhibiting means that includes a ferrous portion that is selectively magnetically attractable by said electromagnet first inhibiting means. Said interconnecting means also includes a second inhibiting means that is capable of elastically deflecting said ferrous portion relative to said pawl. Said second inhibiting means is typically comprised of a leaf spring. Upon opening of the vehicle door the vehicle door sensing means energizes the electromagnet to attract the ferrous portion of the interconnecting means. Said ferrous portion of the interconnecting means thus inhibits motion of the free end of the leaf spring second inhibiting means to cause said second inhibiting means to be in an inhibiting condition. Motion of the pawl into locking engagement with the spool associated locking means is thus inhibited during the vehicle door open condition by the magnetic attraction of said electromagnet first inhibiting means and the elastic resilience of said leaf spring second inhibiting means. Fail-safe lock-up is accomplished by overcoming the magnetic attraction of said first inhibiting means or alternatively, the elastic resilience of said second inhibiting means.

A more complete understanding of the improvement in fail-safe retractor inhibiting means in accordance with the present invention as well as recognition of additional objects and advantages thereof, will be afforded to those skilled in the art from a consideration of the following drawings and detailed description of an exemplary embodiment of the invention.

BRIEF DESCRIPTION OF THE DRAWINGS

FIG. 3 is a cut-away end view of the apparatus of FIG. 1 taken in section along plane III—III of FIG. 1.

FIG. 4 is a cut-away top view of the apparatus of FIG. 1 taken in section along plane IV—IV of FIG. 3.

DETAILED DESCRIPTION OF A PREFERRED EXEMPLARY EMBODIMENT

Figure 1:
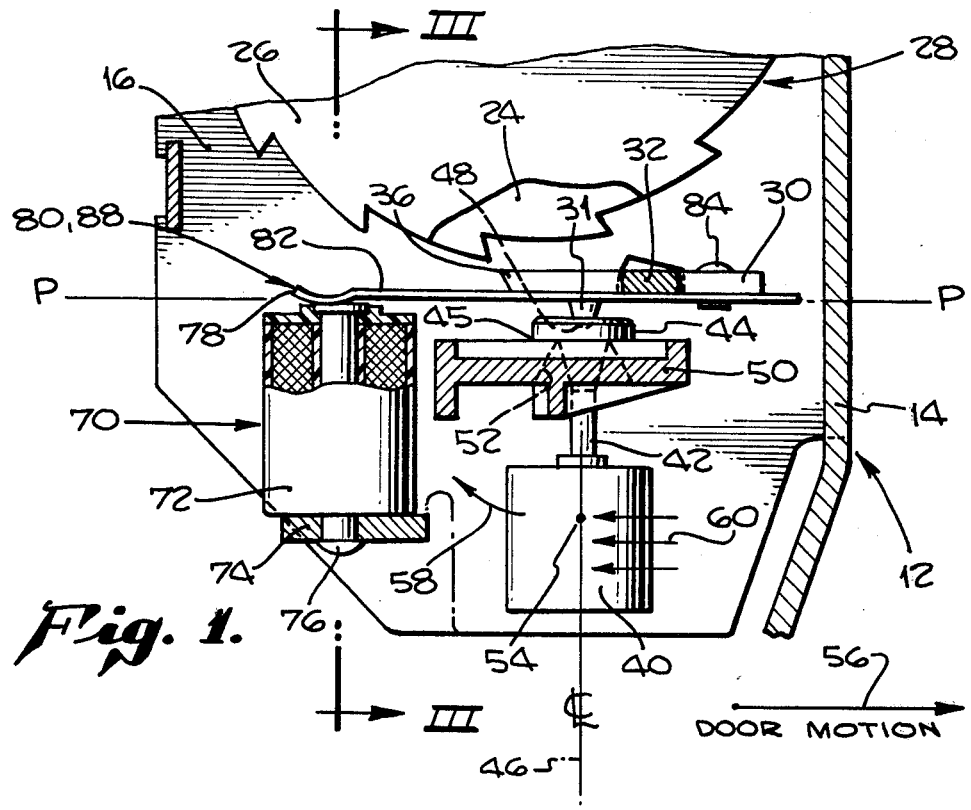
FIG. 1 is a partially cut-away side elevation of an inertially operated safety belt retractor having an appropriate exemplary embodiment of the present invention attached thereto.
Figure 2:
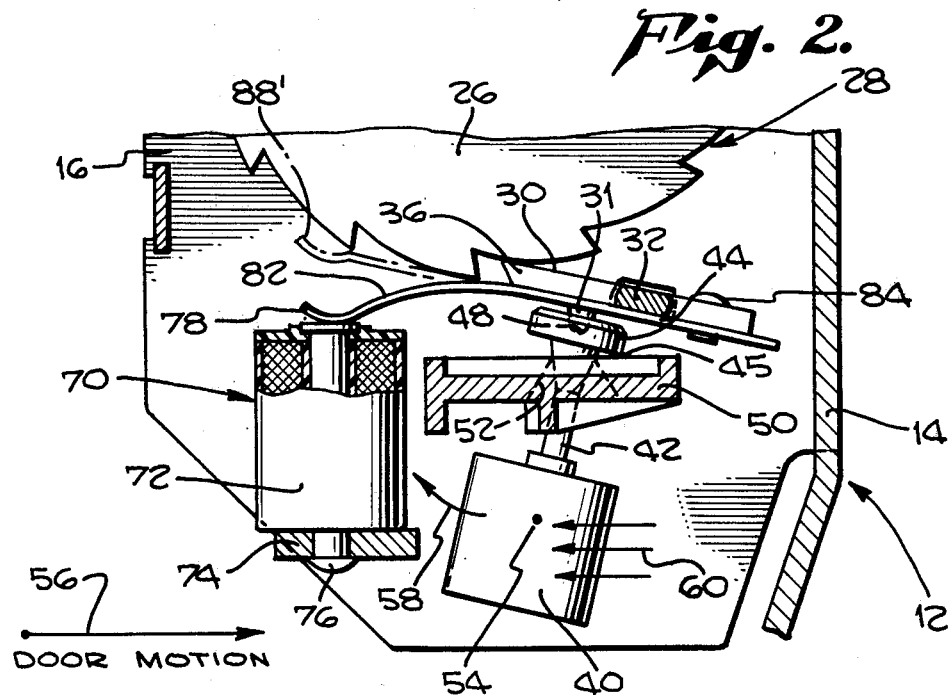
FIG. 2 is a partially cut-away side elevation of the apparatus of FIG. 1 showing the invention in a different operating state.

Referring generally to FIGS. 1 through 4, an exemplary embodiment of an inertially operated safety belt retractor is illustrated. The retractor, as is conventional in emergency locking retractors, includes a generally U-shaped frame 12 having base 14 and sidewalls 16 and 18. A safety belt 20, which may be part of a safety harness or belt system as is known to those skilled in the art, is wound upon a take-up spool 22. The take-up spool includes a pair of toothed rim ratchet wheels 24 and 26 fixed upon a shaft in a spaced relationship about said safety belt 20. Said shaft with spool 22 and ratchet wheels affixed thereto 24 and 26 is rotatably journalled to the side walls 16 and 18 of the retractor frame 12 in conventional manner. Said ratchet wheels 24 and 26 are generally referred to as the spool associated locking means 28 of FIGS. 1 and 2.

A pawl 30 is provided in the exemplary embodiment for engaging and locking said spool associated locking means 28. Said pawl 30 is typically a bar shaped member pivotally mounted between frame side walls 16 and 18 at pivot points 32 and 34 for engagement of the engaging edges 36 and 38 with the respective ratchet wheels 24 and 26 on tilting movement of the pawl 30. A pendulum-like high inertia mass 40 is suspended from a shaft 42 and a disc-shaped head portion 44. Said mass 40 shaft 42 and disc-shaped head portion 44 are concentrically and axially disposed along a vertical axis 46. Depression 48 is disposed substantially at the top center of head portion 44 such that the peripheral edge 45 is disposed concentrically about depression 48. As indicated in FIG. 1, base 50 is typically disposed to be in a horizontal plane such as indicated by the line P—P. Shaft 42 passes through a hole 52 in base 50 concentrically disposed about shaft 42 and of sufficient diameter such that shaft 42 can move radially in any direction to cause disc-shaped head portion 44 to tip in any direction about peripheral edge 45 as a fulcrum point. Pawl 30 includes an operating member 31 disposed on said pawl 30 to engage depression 48 of the disc-shaped head portion 44 such that when the combination of the high inertia mass 40, the shaft 42, and the disc-shaped head portion 44 tip about peripheral edge 45 as a fulcrum point, depression 48 of disc-shaped head portion 44 engages the operating member 31 of the pawl 30 to cause the engaging edges of the pawl 36 and 38 to engage the spool associated locking means 28 to cause retractor lock-up. The center of gravity 54 of the combination high inertia mass 40, shaft 42, and disc-shaped head portion 44 is located along said vertical axis 46 and disposed below the horizontal plane indicated by the line P—P such that the combination is subjected to a gravitational force tending to hold the disc-shaped head portion against base 50 to resist tipping about peripheral edge 45 equally in any direction. The retractor construction explained thus far is considered conventional.

With the basic inertial operating system heretofore described, if the vehicle door were suddenly opened, in the direction indicated by arrow 56, high inertia mass 40 would resist movement, due to the inertia thereof, causing the disc-shaped head portion 44, shaft 42, and high inertia mass 40 to be tipped or rotated about the peripheral edge 45 as a fulcrum point in the direction indicated by arrow 58. As can then be seen, this resistence to what is more simply referred to as lateral forces 60 upon the high inertia mass 40 and associated with the normal opening of the vehicle door, may cause an undesired lock-up of the retractor preventing protraction of safety belt 20.

As is particularly contemplated within the present invention to inhibit undesired lock-up of the retractor during the door opening operation, but maintain a fail-safe capability of locking up the retractor during periods of excessive lateral force encountered during emergency conditions even though the door is open, a plurality of mutually overriding inhibiting means 70 and 80 are provided.

A first inhibiting means 70 for inhibiting, but not preventing, lock-up of the pawl 30 with the spool associated locking means 28 thus preventing protraction of the safety belt 20 is provided. In the exemplary embodiment, such first inhibiting means comprises an electromagnet 72 mounted upon a base 74 integral with the retractor frame 12 by a bolt 76. The electromagnet 72 is electrically wired to either an electrical or a mechanical door sensing means such that when the door is in an open condition, the electromagnet is activated to an energized or magnetically attracting condition to operate upon pawl 30 in an inhibiting mode as subsequently described. Briefly, the electromagnet attracts an interconnecting means, including leaf spring 82 in the exemplary embodiment which is attached to pawl 30, when the vehicle door is open to inhibit, but not prevent pawl movement toward locking engagement with the spool.

A second inhibiting means 80 for inhibiting, but not preventing, movement of the pawl 30 into locking engagement with the spool associated locking means 28 is also provided. In the exemplary embodiment, said second inhibiting means 80 consists of providing at least a portion of the interconnecting means in the form of an elastically springable member. Specifically leaf spring 82 is fixedly attached to the pawl 30 by conventional attaching means 84 and is elastically bendable as subsequently described. Said leaf spring 82 extends radially from the pivots 32 and 34 such that when the free end 86 of the leaf spring 82 is engaged by electromagnet 72, tilting of the pawl about the pivot points 32 and 34 cause the leaf spring 82 to elastically deflect. Said deflection in turn imparts a restoring force upon the pawl resisting further movement of the pawl 30.

From the foregoing, it can be seen that when the vehicle is in the door closed, normal operating condition that the first inhibiting means 70 is not activated by the vehicle door sensing means and thus does not activate the second inhibiting means 80 to inhibit movement of the pawl 30 into locking engagement with the spool associated locking means 28 in response to lateral forces 60 upon the high inertia mass 40. In this operating condition, as best shown in FIG. 1, a first magnitude of lateral force is necessary for the high inertia mass to pivot sufficiently to cause engagement of the pawl 30 with the spool associated locking means 28.

In the door open condition, the vehicle door sensing means causes the electromagnet 72 to be in an activated or energized condition and thus magnetically attracting the ferrous portion 78 of the interconnecting means 88 to inhibit movement of the pawl 30 into locking engagement with the spool associated locking means 28. Magnetically attracting and thus engaging ferrous portion 78 of the interconnecting means 88 causes the second inhibiting means 80 to be in an inhibiting condition, resisting movement of the pawl 30 into locking engagement with the spool associated locking means 28 by elastically deflecting the leaf spring second inhibiting means 80. The first and second inhibiting means together combine to inhibit lock-up of the retractor in response to lateral forces upon the high inertia mass 40 associated with the normal opening and closing of the vehicle door.

As particularly contemplated by the present invention, a second, higher, magnitude of lateral force is necessary to lock-up the retractor during the door open condition; however, when excessive lateral forces associated with an emergency condition are encountered, each of the inhibiting means is capable of independently overriding the inhibiting effect of the combined inhibiting means to allow lock-up of the safety belt retractor in a fail-safe manner. As can best be seen in FIG. 2, fail-safe lock-up of the retractor occurs in two modes. Lock-up by the first mode occurs when the force resulting from lateral forces 60 upon the high inertia mass 40 exceed the magnetic attraction between the ferrous portion 78 and the energized electromagnet 72 as shown by the ghosted outline of the interconnecting means 88'. In the second fail-safe mode, forces resulting from lateral forces 60 upon the high inertial mass 40 exceed the elastic resilience or restoring force of the elastically deflectable leaf spring 82 of the second inhibiting means 80 independent of the magnetic attraction of the ferrous portion 78 to the electromagnet 72, as shown by the solid outline of the interconnecting means 88.

Failure of any one of the inhibiting means results in lock-up of the retractor at a lateral force exceeding the first, lower, rather than second magnitude of lateral force, as previously described, thus insuring passenger restraint and safety during inhibitor malfunction.

Having thus described a preferred exemplary embodiment of a fail-safe inertially operated safety belt retractor inhibitor mechanism in accordance with the present invention, it should be apparent to those skilled in the art that various additional alternative embodiments, adaptations, and modifications can be made within the scope and spirit of the present invention which is defined by the following claims.

I claim:

1. In an inertially operated safety belt retractor having a spool associated locking means to prevent protraction of a safety belt that is responsive to lateral forces on a high inertia mass, a sensing means for sensing when the door is in an unlocked condition, and a lock-up inhibiting means responsive to said sensing means for resisting lock-up of said locking means whenever the door is in an unlocked condition, the improvement in said lock-up inhibiting means comprised of:
    (a) first inhibiting means activated by said sensing means upon opening of said door to inhibit said spool associated locking means;
    (b) interconnecting means operable between said first inhibiting means and said spool associated locking means; and
    (c) said interconnecting means including a second inhibiting means for inhibiting lock-up of said locking means whenever said first inhibiting means is an inhibiting condition, whereby said spool associated locking means will lock-up in a fail-safe manner in response to high lateral forces upon said high inertia mass associated with an emergency condition which overcomes the inhibiting effect of either said first or second inhibiting means.

2. The improvement in lock-up inhibiting means of claim 1 wherein said first inhibiting means is an electromagnet, and said second inhibiting means has a first portion connected to said spool associated locking means, a second portion selectively magnetically attracted by said electromagnet, and a member interconnecting said first and second portions that elastically deflects in response to forces upon said high inertia mass when said first inhibiting means is in an inhibiting condition, to permit lock-up in a fail-safe manner.

3. The improvement in lock-up inhibiting means of claim 2 wherein said interconnecting member of said second inhibiting means is a spring-like member such that lateral forces on said high inertia mass associated with an emergency condition would overcome either
    (a) the magnetic attraction of the first portion of the second inhibiting means to the first, electromagnetic, inhibiting means, or
    (b) the elastic resilience of said spring-like member to cause lock-up of said spool associated locking means in a fail-safe manner.

4. The improvement in lock-up inhibiting means of claim 1 wherein said first inhibiting means and said second inhibiting means will each override at a substantially identical magnitude of lateral force upon said high inertia mass.

5. In an inertially operated safety belt retractor adapted for mounting in a vehicular door, said door having a moveable locking member for engaging a mating member on the door frame for holding the door in a closed and locked position, the retractor including a spool rotatably journalled in a retractor frame, a safety belt wound on the spool, a moveable pawl for engaging spool associated locking means to prevent protraction of the safety belt, a high inertia mass pivoting about a fulcrum point for moving the pawl into engagement with the spool associated locking means during periods of high lateral force on the mass, such as those associated with an emergency condition, a lock-up inhibitor comprised of sensing means for sensing that the vehicle door is open and inhibiting means, cooperating with said sensing means, for imposing a higher threshold of lateral force necessary for the mass to engage the pawl with the spool associated locking means to prevent protraction of the safety belt thus inhibiting, but not preventing, lock-up of the spool associated locking means whenever the door is open, the improvement in said lock-up inhibitor for providing fail-safe lock-up comprised of a plurality of mutually overriding inhibiting means including:
(a) first inhibiting means activated by said sensing means upon opening of said door to inhibit pawl movement;
(b) interconnecting means operable between said pawl and said first inhibiting means; and
(c) said interconnecting means including a second inhibiting means for inhibiting, but not preventing, lock-up when said first inhibiting means is an inhibiting condition, whereby said pawl will lock-up in a fail-safe manner in response to the application of force upon said high inertia mass exceeding the inhibiting effect of either said first or second inhibiting means.

6. The improvement in lock-up inhibiting means of claim 5 wherein said first inhibiting means is an electromagnet, and said second inhibiting means has a first portion connected to said spool associated locking means, a second portion selectively magnetically attracted by said electromagnet, and a member interconnecting said first and second portions that elastically deflects in response to lateral forces upon said high inertia mass, when said first inhibiting means is an inhibiting condition, to permit lock-up in a fail-safe manner.

7. The improvement in lock-up inhibiting means of claim 6 wherein said interconnecting member of said second inhibiting means is a spring-like member such that lateral forces on said high inertia mass associated with an emergency condition would overcome the magnetic attraction of said electromagnet first inhibiting means, and alternatively, the elastic resilience of said spring-like second inhibiting means.

8. The improvement in lock-up inhibiting means of claim 5 wherein said first inhibiting means and said second inhibiting means will each override at a substantially identical magnitude of lateral force upon said high inertia mass.

9. In an inertially operated safety belt retractor adapted for mounting in a vehicular door, said door having a moveable locking member for engaging a mating member on the door frame for holding the door in a closed and locked position, the retractor including a spool rotatably journalled in a retractor frame, a safety belt wound on the spool, a moveable pawl for engaging spool associated locking means to prevent protraction of the safety belt, a high inertia mass pivoting about a fulcrum point for moving the pawl into engagement with the spool associated locking means during periods of high lateral force on the mass, such as those associated with an emergency condition, a lock-up inhibitor comprised of sensing means for sensing that the vehicle door is open and inhibiting means, cooperating with said sensing means, for imposing a higher threshold of lateral force necessary for the mass to engage the pawl with the spool associated locking means to prevent protraction of the safety belt thus inhibiting, but not preventing, lock-up of the spool associated locking means whenever the vehicle door is open, the improvement in said lock-up inhibitor for providing fail-safe lock-up comprised of a plurality of mutually overriding inhibiting means including:
(a) first inhibiting means comprised of an electromagnet that is selectively activated to an energized condition in response to the vehicle door sensing means to selectively attract a
(b) ferrous portion of an interconnecting means that interconnects said ferrous portion with said pawl, such that said attraction resists movement of the pawl into locking engagement with the spool associated locking means, said interconnecting means including a
(c) second inhibiting means comprised of an elastically deflectable portion of said interconnecting means, such that when the first inhibiting means is in an inhibiting condition in response to said vehicle door sensing means, the elastic resilience of said elastically deflectable portion resists movement of the pawl into locking engagement with the spool associated locking means, and lock-up will occur in a fail-safe manner when the door is open by exceeding the magnetic attraction of said first inhibiting means and alternatively, by exceeding the elastic resilience of said second inhibiting means to allow said pawl to engage said spool associated locking means.

10. In an inertially operated safety belt retractor having a spool associated locking means to prevent protraction of a safety belt that is responsive to lateral forces on a high inertia mass, a sensing means for sensing when the door is in an unlocked condition, and a lock-up inhibiting means responsive to said sensing means for resisting lock-up of said locking means whenever the door is in an unlocked condition, the method of providing fail-safe override of said lock-up inhibiting means by:
(a) inhibiting lock-up of said pawl by magnetically attracting a ferrous member connected to said pawl toward an unlocked position;
(b) further inhibiting lock-up of said pawl requiring elastic deflection of said connecting member when said ferrous member is in a magnetically attracted condition; and
(c) causing fail-safe lock-up of said pawl with said spool associated locking means by exceeding said magnetic attraction and alternatively by elastically deflecting said connecting member.

11. The method of providing fail-safe lock-up of a lock-up inhibitor associated with a passive, inertially operated safety belt retractor including a moveable pawl and a spool associated locking means by:
(a) providing a deflectable member attached to said pawl;
(b) magnetically attracting a ferrous portion of said deflectable member; and
(c) causing fail-safe lock-up of said pawl by applying a lateral force upon the retractor associated high inertia mass exceeding said magnetic attraction and alternatively by deflecting said deflectable member.

* * * * *